(12) United States Patent
Boyak et al.

(10) Patent No.: US 9,079,141 B2
(45) Date of Patent: Jul. 14, 2015

(54) VORTEX-TYPE MIXING DEVICE FOR A DOWN-FLOW HYDROPROCESSING REACTOR

(71) Applicants: Craig Boyak, El Cerrito, CA (US); Abdenour Kemoun, Pleasant Hill, CA (US); Ralph Evans Killen, San Francisco, CA (US); Krishniah Parimi, Alamo, CA (US); Steven Xuqi Song, Albany, CA (US)

(72) Inventors: Craig Boyak, El Cerrito, CA (US); Abdenour Kemoun, Pleasant Hill, CA (US); Ralph Evans Killen, San Francisco, CA (US); Krishniah Parimi, Alamo, CA (US); Steven Xuqi Song, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 421 days.

(21) Appl. No.: 13/663,570

(22) Filed: Oct. 30, 2012

(65) Prior Publication Data

US 2013/0064740 A1 Mar. 14, 2013

(51) Int. Cl.
*B01J 8/04* (2006.01)
*B01F 3/04* (2006.01)
*B01F 5/00* (2006.01)

(52) U.S. Cl.
CPC ......... *B01F 3/04113* (2013.01); *B01F 3/04503* (2013.01); *B01F 5/0057* (2013.01); *B01J 8/04* (2013.01); *B01J 8/0453* (2013.01); *B01J 8/0492* (2013.01); *B01J 2208/00884* (2013.01); *B01J 2208/00938* (2013.01)

(58) Field of Classification Search
CPC .............................. B01J 8/04; B01F 3/04113
USPC ......... 422/600, 645, 647, 648, 606, 202, 224, 422/257; 261/114.2, 113
See application file for complete search history.

(56) References Cited

U.S. PATENT DOCUMENTS

2010/0303685 A1   12/2010   Kemoun et al.

FOREIGN PATENT DOCUMENTS

WO   00/37171   6/2000

OTHER PUBLICATIONS

PCT/US2013/060329, Notification of Transmittal of the International Search Report and the Written Opinion of the International Searching Authority, or the Declaration, mailing date Jun. 24, 2014, 68 pages.

*Primary Examiner* — Walter D Griffin
*Assistant Examiner* — Huy-Tram Nguyen
(74) *Attorney, Agent, or Firm* — Michael D. Ross

(57) ABSTRACT

The present invention is directed to a vortex-type mixing device for a down-flow hydroprocessing reactor. In particular, the device improves the effectiveness of an existing mixing volume in mixing the gas phase and liquid phase of two-phase systems. According to the present invention, the mixing device helps create a highly arcuate flow to incoming effluents and a high degree of mixing within a constrained interbed space of a hydroprocessing reactor.

14 Claims, 5 Drawing Sheets

VORTEX-TYPE MIXING DEVICE FOR A DOWN-FLOW HYDROPROCESSING REACTOR

FIELD OF THE INVENTION

This invention is directed to a vortex-type mixing device for a down-flow hydroprocessing reactor. Such down-flow hydroprocessing reactors are used in the petroleum and chemical processing industries for carrying out catalytic reactions of hydrocarbonaceous feedstocks in the presence of hydrogen, at an elevated temperature and pressure. Exemplary reactions including hydrotreating, hydrofinishing, hydrocracking and hydrodewaxing.

BACKGROUND OF THE INVENTION

In fixed-bed hydroprocessing reactors, gas and liquid reactants (e.g. hydrogen and a hydrocarbonaceous feedstock) flow downward through one or more beds of solid catalyst. (See, e.g. U.S. Pat. No. 4,597,854 to Penick).

As the reactants flow downward through the reactor catalyst beds, the reactants contact the catalyst materials and react to produce the desired products. Gas reactants such as hydrogen are consumed, and heat is generated by the catalytic reactions. Controlling the temperature of the feedstock as it travels downward through the reactor is important to ensure the quality and quantity of product yield is maximized toward the target product(s).

Cool hydrogen-rich gas can be introduced between the catalyst beds to quench the temperature rise and replenish the hydrogen consumed by the reactions. In order to maintain overall reactor performance, the temperature of the fluids within the reactor should be as uniform as possible and liquids and gases should be well mixed in order to maximize performance. Poor interbed fluid mixing can limit reactor operation in various ways. When interbed mixing is unable to erase the radial temperature differences, these differences persist or grow as the process fluids move down the reactor. Hot spots in any bed can lead to rapid deactivation of the catalyst in that region which shortens the total reactor cycle length. Product selectivities are typically poorer at high temperatures. For example, hot regions can cause color, viscosity and other product qualities to be off-specification. Also, if the temperature at any point exceeds a certain value (typically 800 to 850° F.), the exothermic reactions may become self-accelerating leading to a runaway event, which can damage the catalyst, the vessel, or downstream equipment.

Due to these hazards, refiners operating with poor reactor internal hardware must sacrifice yield and/or throughput to avoid the deleterious effects of poor interbed fluid mixing. Reactor temperature maldistribution and hot spots can be minimized through mixing and equilibration of reactants between catalyst beds, correcting any temperature and flow maldistributions, and minimizing pressure drops. The mixing of fluids between catalyst beds can be accomplished through the use of distributer assemblies and mixing chambers. With present-day refinery economics dictating that hydroprocessing units operate at feed rates far exceeding design, optimum interbed fluid mixing is a valuable low-cost debottleneck.

Distributor assemblies can be used to collect, mix, and distribute fluids in the interbed region of multi-bed catalyst reactors. Distributor assemblies generally include a trough for collecting and mixing liquid and gas flowing from an overhead catalyst bed, and a mixing device or chamber disposed centrally within the trough for receiving liquid from the trough and further mixing the liquid and gas.

The mixing device is a key component of many distributor assemblies because it provides efficient and thorough mixing of fluids/gases and helps avoid hot spots and poor temperature distribution.

The mixing device has at least one inlet for receiving liquid from the trough and at least one outlet for directing flow toward an underlying catalyst bed. Designs for mixing devices vary, including baffle mixer designs such as ribbon blenders and disk-and-donut type mixers that promote mixing through changing the direction of the fluid and gases.

Another type of mixer is a centrifugal or vortex-type design. This type of mixer collects the liquid and gas streams flowing downward through the reactor, and introduces them into a circular chamber where they make several rotations before being passed downward through a centrally located aperture.

If present, the mixing device is generally located in the interbed space between catalyst beds in a reactor. The interbed space in many reactors is limited due to the presence of support beams, piping, and other obstructions which occupy the interbed region. Due to these space constraints, unique hardware, such as a mixing device scaled to fit the space available, is required to perform efficient two-phase mixing in what amounts to limited volume. In addition, lower height distributor assemblies can increase catalyst loading volume with the same reactor volume, therefore improve utilization of the reactor volume.

Due to the importance of sufficient interbed fluid mixing for good catalyst lifetimes, high throughput, long cycle length, and overall reactor performance, improved mixing devices are needed. In addition, mixing devices that have lower vertical footprint and that can be retrofitted to existing reactors which have limited interbed space are of particular necessity.

SUMMARY OF THE INVENTION

The present invention is directed to a vortex-type mixing device for a down-flow hydroprocessing reactor. The mixing device provides a more effective mixing of fluids in the space between catalyst beds in a multi-bed reactor. In particular, the invention is direct to a mixing device that improves the effectiveness of an existing mixing volume in mixing the gas phase and liquid phase of two-phase systems. The device is well suited for retrofit applications due to its relatively small size and can also be scaled for new reactor designs to achieve efficient fluid mixing in the interbed space of a multi-bed reactor.

The mixing device includes a horizontal cover plate having an inner surface and a base plate extending parallel to the cover plate. The base plate having an inner surface and a base plate aperture.

A plurality of inwardly-curved vanes extend vertically between the inner surfaces of the cover and base plates. A vertical weir ring extends vertically from the base plate inner surface proximal to the circular aperture. The weir ring has a weir ring top edge and a weir ring diameter. A bubble cap extends downwardly from the inner surface of the cover plate into a mixing region. The bubble cap has a bubble cap diameter and a bottom edge, the bubble cap diameter being smaller than the weir ring diameter, and the bubble cap bottom edge extends below the weir ring top edge.

BRIEF DESCRIPTION OF THE DRAWINGS

FIG. 4 is a top plan view of the mixing device.

DETAILED DESCRIPTION

It has been found that the vortex-type mixing device of the present invention affords benefits over vortex-type mixing devices known in the art. Such benefits include, a reduced vertical footprint in the reactor (reduction in reactor volume occupied by inter bed distributor assemblies), high throughput, enhanced mixing, lower pressure drop, and enhanced overall reactor performance. Specific embodiments and benefits are apparent from the detailed description provided herein. It should be understood, however, that the detailed description and specific examples, while indicating embodiments among those preferred, are intended for purposes of illustration only and are not intended to limit the scope of the invention.

Figure 1:
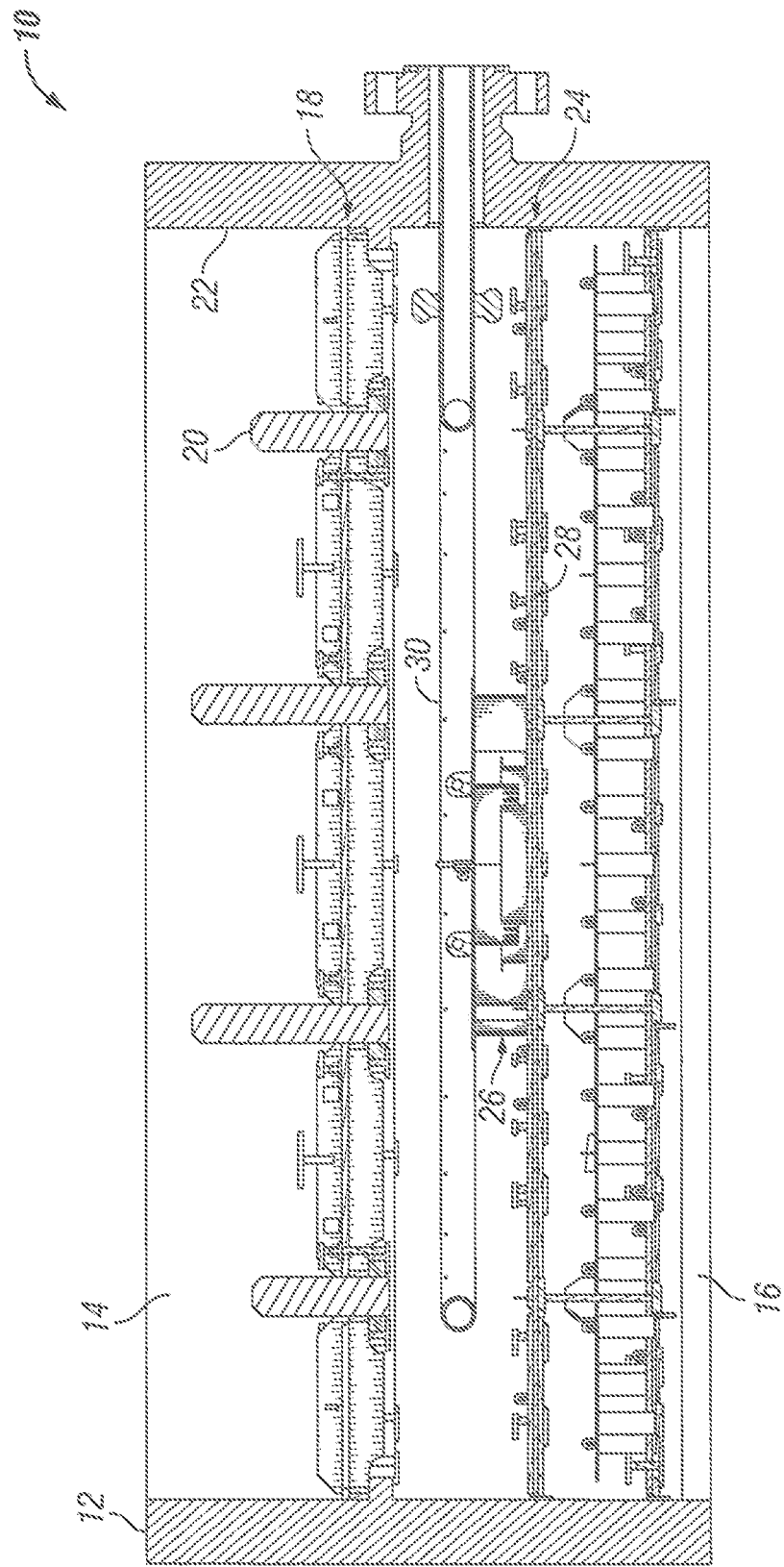
FIG. 1 is a schematic view of an embodiment of the mixing device of the invention situated within a multi bed catalytic reactor.

The present invention is directed to a vortex-type mixing device for a multi-bed hydroprocessing reactor. Referring to FIG. 1, a cross-sectional diagram of a portion of a multi-bed down-flow reactor 10 is illustrated. The reactor 10 includes a vessel shell 12, upper and lower catalyst beds (14 and 16, respectively) containing packed catalytic extrudates. Each catalyst bed 14, 16 is supported on a grid screen assembly 18 (illustrated for catalyst bed 14 only) composed of a support grid, optional space cloth and screen, all of which are well known in the art. The grid screen assembly is mounted on parallel support beams 20 that are horizontally mounted to the reactor vessel inner wall 22, and extend upwardly into the catalyst bed 14.

An interbed distribution assembly 24 is vertically interposed between the catalyst beds 14, 16. The interbed distribution assembly 24 includes a vortex-type mixing device 26 of the present invention. The mixing device 26 of the invention is mounted under the catalyst bed 14, and in fluid tight communication with a collection plate 28 adapted to receive and mix liquid and gas flowing down from the overhead. A quench gas inlet tube 30 distributes quench gas (e.g. hydrogen) into the region above the mixing device 26.

Figure 2:
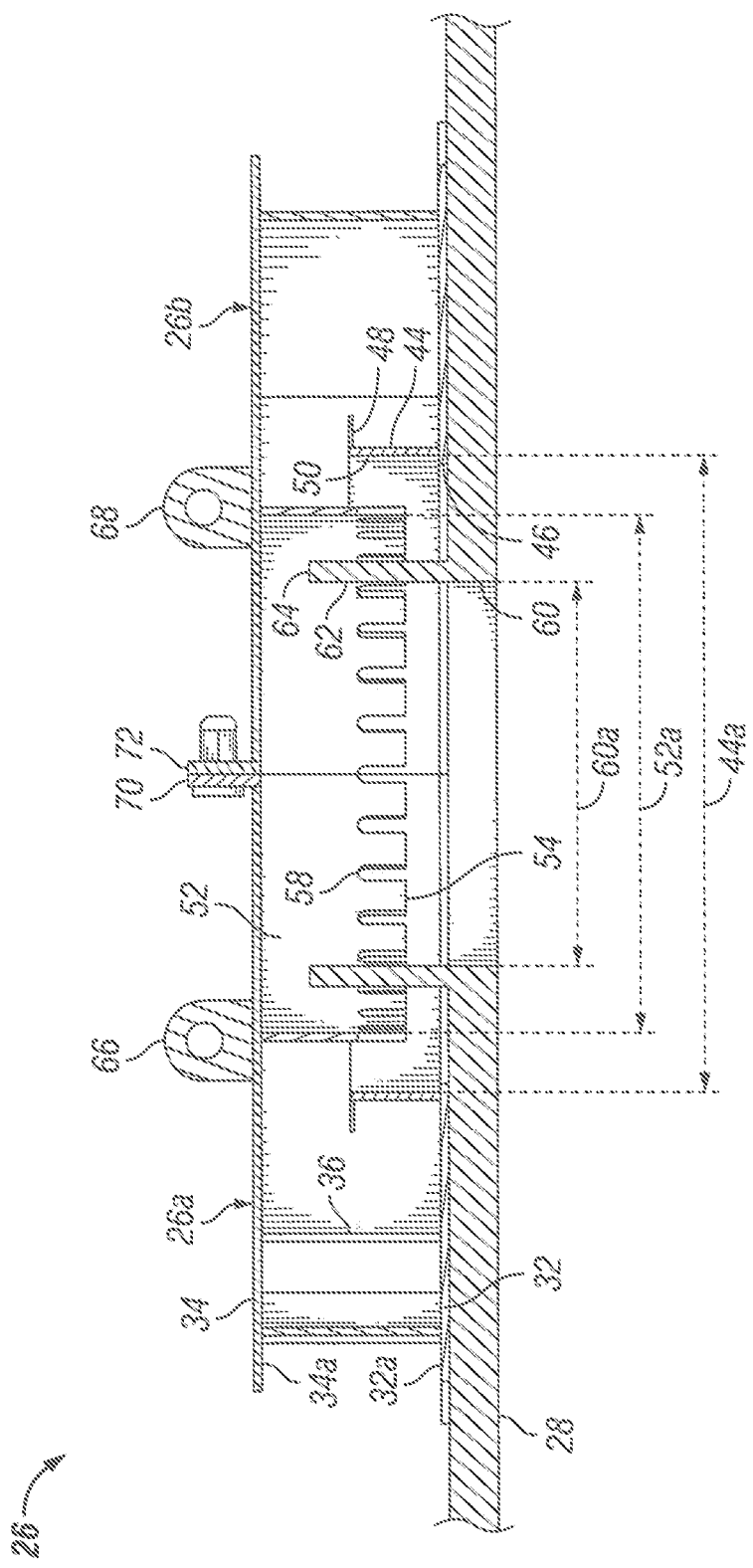
FIG. 2 is a cross-sectional diagram of the mixing device of the present invention.
Figure 3:
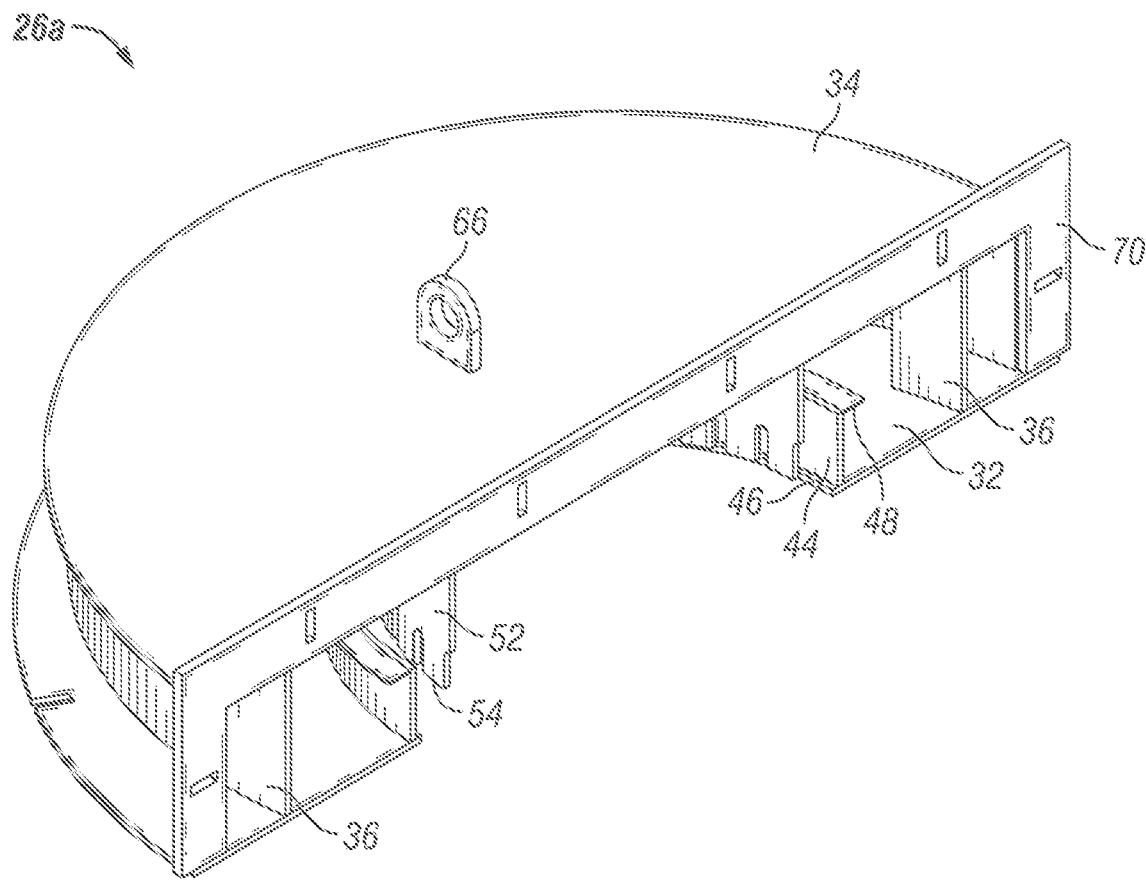
FIG. 3 is an isometric view of one half of the mixing device 26.
Figure 4:
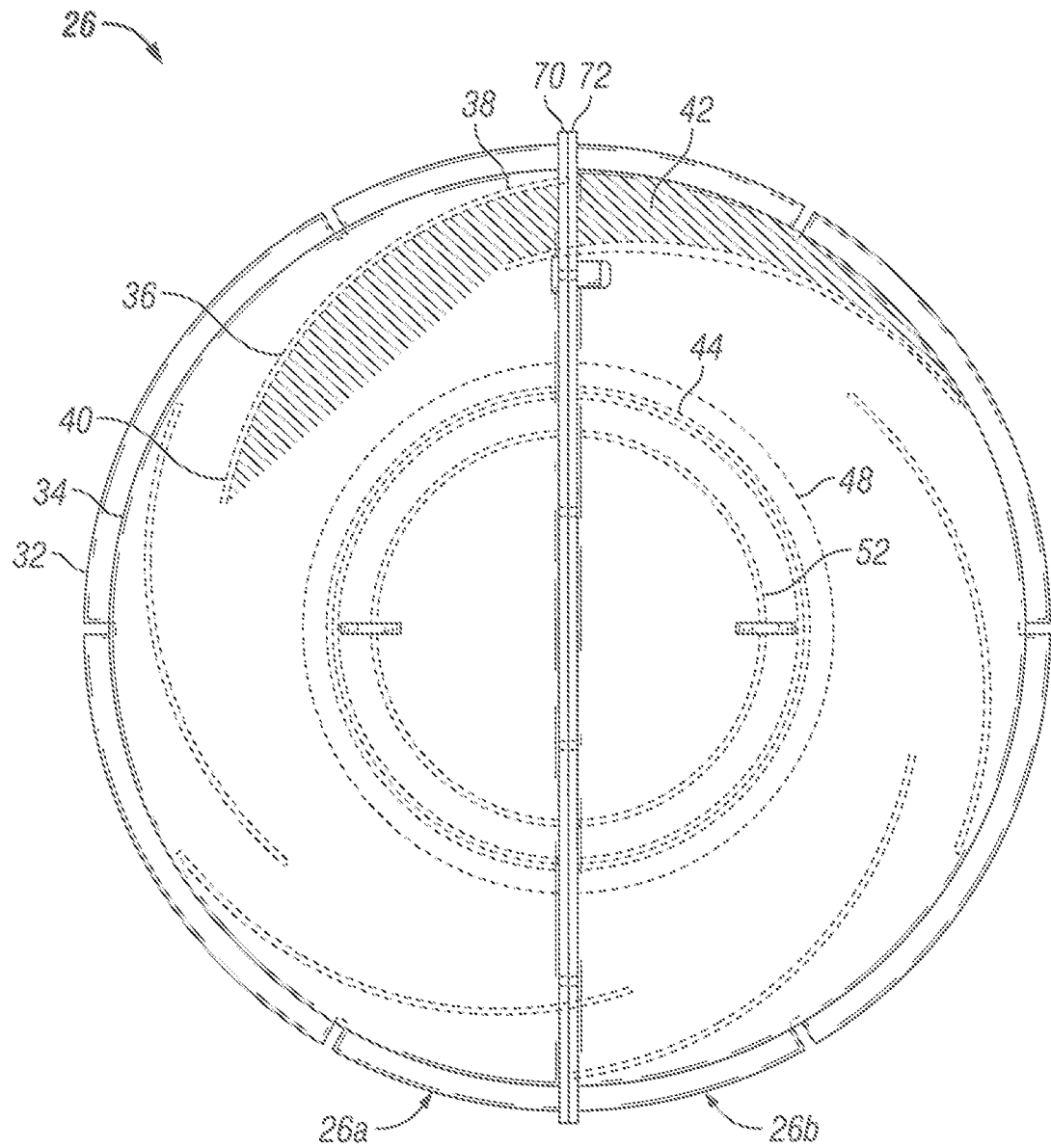
FIG. 4 is a top plan view of the mixing device 26.

FIG. 2 is a cross-sectional diagram of the mixing device 26, FIG. 3 is an isometric view of one half of the mixing device 26, and FIG. 4 is a top plan view of the mixing device 26.

The mixing device includes a base plate 32 having an inner surface 32a and mounted in fluid tight communication with the collection plate 28 (FIG. 1), and a cover plate 34 having a cover plate inner surface 34a which extends substantially horizontally relative to the base plate 32. The annular collection plate 28 collects fluids flowing down from the overlying catalyst bed.

A plurality of staggered, inwardly-curved vanes 36 are fixedly attached to, and extend vertically between, the base and cover plate inner surfaces 32a and 34a, respectively. In one embodiment, the vanes 36 are in fluid tight communication with the base and cover plate inner surfaces 32a and 34a, respectively.

As shown in FIG. 4, each vane has a vane external end 38 affixed proximal to the outer periphery of the cover plate 34, and internal end 40 located proximal to a mixing region (described herein below) of the mixing device 26. The open space between the vanes 36 define a series of mixing device inlet regions 42, each inlet region 42 being defined as area bound by neighboring vanes 36 and their respective ends 38,40.

Referring again to FIG. 2, a weir ring 44 extends vertically from the base plate 32, proximal to a centrally-positioned circular base plate aperture defined by edge 46. In one embodiment, the weir ring 44 has a vertical height of one-half of the vertical height of the vanes 36. A weir ring horizontal plate 48 extends outwardly from the weir ring upper edge 50. The weir ring horizontal plate 48 is preferably perforated.

A circular bubble cap 52 affixed to, preferably in fluid tight communication with, the cover plate inner surface 34a extends from the cover plate 34 downwardly into the center of a mixing region of the mixing device 26 (the mixing region being defined as the area between the plates 32,34, excluding the inlet regions 42, or, stated differently, the region defined by the area between opposing vane internal ends 40). The bubble cap may be keyed as illustrated in FIGS. 2 and 3.

The lower end 54 of the bubble cap 52 extends a distance 52a below the weir ring upper edge 50. In one embodiment, wherein the bubble cap lower edge 54 is keyed, the upper edges 58 defining the keyed openings are positioned below the weir ring upper edge 50.

The collection plate 28 includes a circular aperture defined by edge 60, and a riser tube 62 proximal to the collection plate circular aperture 60 extends vertically upward from the collection plate 28 and into the bubble cap 52. The top edge 64 of the riser tube 62 is situated at or above the bubble cap upper edge 58 of the keyed openings.

As shown in FIG. 2, the weir ring 44, bubble cap 52 and collection plate aperture 60 each have a diameter $44a$, $52a$ and $60a$, respectively, wherein the measured values of the diameters have the following relationship: $60a<52a<44a$.

In operation, hydrocarbonaceous liquid feed rains down from the catalyst bed 14, through the grid screen assembly 18, and onto the annular collection plate 28. Typically, the liquid will collect and rise to a liquid level at or above the height of the weir ring horizontal plate 48. Gas from the upper catalyst bed 14 mixed with quench gas (e.g. hydrogen gas) introduced via the quench gas inlet tube 30 fills the void between the liquid collected on the annular collection plate 28 and the catalyst bed 14.

The liquid and gas enter the mixing device 26 via the mixing device inlet regions 42, wherein the vanes 36 tangentially direct the liquid and gas to flow in an arcuate or circular flow pattern as the liquid and gas enter the mixing region of the mixing device 26. The liquid travels up and over the weir ring 44 (and through the horizontal weir plate 48 if it is perforated), and intermixes with the gas as the liquid/gas flow into the bubble cap 52 under its lower end 54 and through the keyed openings, over the riser tube top end 64 and into the riser tube 62. The intermixed gas and liquid then travel downward out of the riser tube 62, typically to a tray containing a plurality of perforations, downcomers or nozzles, and then on to the lower catalyst bed 16. Perforated spiral plates are installed on inner surface of the riser 62 to further improve gas/liquid mixing while flowing downward in the riser 62.

As can be appreciated by one skilled in the art, a mixing device 26 as described herein is intended for use in a large hydroprocessing reactor designed to process thousands or tens-of-thousands of barrels of feedstock per day (1 barrel=43 gal.; 164 L). Accordingly, the mixing device 26 described herein may be several feet in diameter and, because of the materials used to construct the device 26 (e.g. ¼"-½" plate steel), weigh several hundred pounds (.lbs) when constructed.

The mixing device 26 of the present invention may be constructed in place by welding or otherwise affixing the individual components together to achieve construction of the finished device 26. However, it will be recognized that constructing the device 26 in place using this method may take several days, delaying operation of the reactor unit. In addition, where the device 26 is being employed to update or retrofit the design of an existing reactor, it is desirable to reduce the amount of assembly taking place within the reactor vessel (due to safety concerns such as possibly igniting residual hydrocarbon materials remaining in the reactor).

In order to reduce the amount of time needed to construct a new reactor, or retrofit an existing reactor, portions of the mixing device 26 are preferably pre-assembled to form subassemblies, and the subassemblies are inserted into the reactor and assembled to form the completed mixing device 26.

In one embodiment illustrated in FIGS. 2, 3 and 4, the mixing device 26 consists of two mixing device subassemblies 26a,26b, each representing one-half of the mixing device 26. Each subassembly 26a,26b is provided with one or more lifting lugs 66 and 68, respectively. The lifting lugs 66,68 are provided for attaching each subassembly 66,68 to a hoist, crane or other device capable of lowering the subassembly into the reactor and maneuvering the subassembly into place.

Each subassembly 26a,26b is provided with a mating flange 70 and 72, respectively, containing a plurality of openings through which a nut/bolt combination (or such other appropriate affixing device) can be inserted to hold the subassemblies 26a,26b in place during operation, and further allows the subassemblies 26a,26b to be disassembled between operating periods during maintenance to allow access to the areas above and below the mixing device 26.

Figure 5:
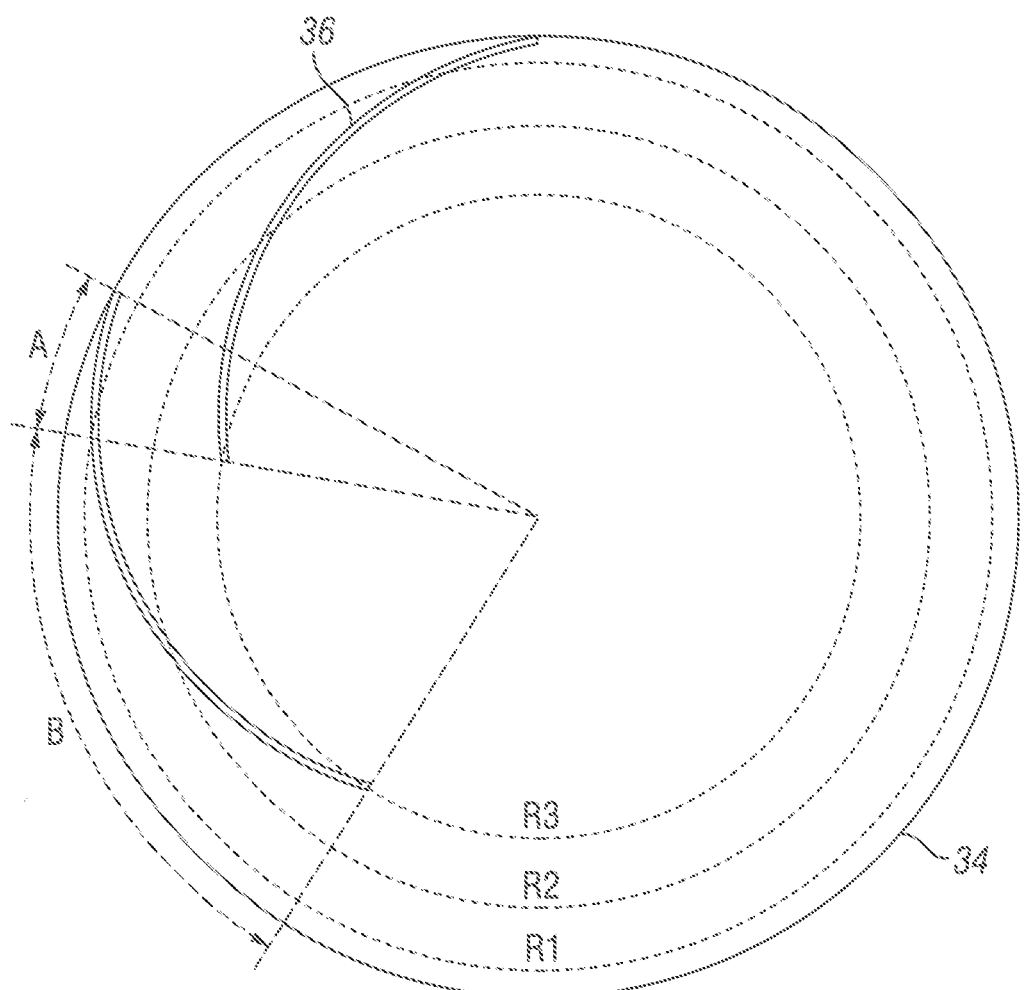
FIG. 5 is a top plan view illustrating the layout of the vanes.

Referring to FIG. 5, the horizontal placement of the vanes 36 is illustrated. Circle R1, representing the outer diameter of the mixing device 26 as prescribed by process hydraulic calculations employed by those skilled in the art, along with circle R3, presenting the inner diameter of the mixing device inlet regions 42 also prescribed by process hydraulic calculations, are illustrated. Circle R2 is located half the radial distance between R1 and R3.

Angle "A" of FIG. 5 represents the angular offset of each corresponding vane 36, which results in a radial overlap of a vane internal end 40 with a larger portion of a neighboring vein external end 38. In one embodiment, A=15° for a 4 vane system, 10° for a 6 vane system, and 8° for a 8 vane system. Angle "B" represents the radial distance the vane 36 occupies within the region between R1 and R3. In one embodiment, B=360°/(the number of vanes). At angle "A", the inner surface of the vane 36 intersects with R1. At an angle that is the sum of angles "A" and "B" (A+B) the inner surface of the vane 36 intersects with R3. At an angle that equals A+B/2, the inner surface of the vane 36 intersects with R2.

The radial overlap of the vanes 36 is defined by angle "A". In operation, the liquid and gas enter the mixing device 26 via the mixing device inlet regions 42, wherein the vanes 36 tangentially direct the liquid and gas to flow in an arcuate or circular flow pattern as the liquid and gas enter the mixing region of the mixing device 26.

The previous description of a preferred embodiment of the present invention is primarily for illustrative purposes, it being recognized that a number of variations might be used which would still incorporate the essence of the invention. Accordingly, reference should be made to the following claims in determining the scope of the invention.

What is claimed is:

1. A mixing device for a multi-bed down-flow catalytic reactor, the mixing device comprising:
   a. a horizontal cover plate having an inner surface;
   b. a base plate extending parallel to the cover plate, the base plate having an inner surface and a base plate aperture;
   c. a plurality of inwardly-curved vanes extending vertically between the inner surfaces of the cover and base plates;
   d. a vertical weir ring extending vertically from the base plate inner surface proximal to the base plate aperture, the weir ring having a weir ring top edge and a weir ring diameter;
   e. a mixing region; and
   f. a bubble cap extending downwardly from the inner surface of the cover plate into the mixing region, the bubble cap having a bubble cap diameter and a bottom edge, the bubble cap diameter being smaller than the weir ring diameter, the bubble cap bottom edge extending below the weir ring top edge.

2. The mixing device of claim 1, therein the vertical weir ring further comprises a horizontal plate extending outwardly from the weir ring top edge.

3. The mixing device of claim 2, wherein the weir ring horizontal plate is perforated.

4. The mixing device of claim 2, wherein the weir ring has a vertical height that is one-half of a height of the vanes.

5. The mixing device of claim 1, the cover plate further comprising an outer periphery, wherein each vane comprises an external end proximal to the outer periphery of the cover plate and an internal end proximal to the mixing region, the mixing device further comprising a plurality of inlet regions defined as an area bound by neighboring vanes and their respective corresponding internal and external ends.

6. The mixing device of claim 5, wherein the mixing region is defined as an area between the cover and base plates, excluding the areas defining the inlet regions.

7. The mixing device of claim 5, wherein the internal end of each vane radially overlaps with the external end of a neighboring vane.

8. A multi-bed down-flow catalytic reactor, comprising:
   an upper and a lower catalyst bed contained in a reactor shell having an inner surface;
   an interbed distribution assembly vertically interposed between the upper and lower catalyst beds;
   the interbed distribution assembly comprising a mixing device affixed above and in fluid tight communication with a collection plate having a collection plate circular aperture and a riser vertically upward from the collection plate proximal to the collection plate circular aperture;
   the mixing device comprising:
   a. a horizontal cover plate having an inner surface;
   b. a base plate extending parallel to the cover plate, the base plate having an inner surface and a base plate aperture;
   c. a plurality of inwardly-curved vanes extending vertically between the inner surfaces of the cover and base plates;
   d. a vertical weir ring extending vertically from the base plate inner surface proximal to the base plate aperture, the weir ring having a weir ring top edge and a weir ring diameter;
   e. a mixing region; and
   f. a bubble cap extending downwardly from the inner surface of the cover plate into the mixing region, the bubble cap having a bubble cap diameter and a bottom edge, the bubble cap diameter being smaller than the weir ring diameter, the bubble cap bottom edge extending below the weir ring top edge;
   wherein the riser extends vertically into the bubble cap, and the collection plate circular aperture being smaller than the bubble cap diameter.

9. The reactor of claim 8, therein the mixing device vertical weir ring further comprises a horizontal plate extending outwardly from the weir ring top edge.

10. The reactor of claim 9, wherein the weir ring horizontal plate is perforated.

11. The reactor of claim 9, wherein the weir ring has a vertical height that is one-half of a height of the vanes.

12. The reactor of claim 8, the mixing device cover plate further comprising an outer periphery, wherein each vane comprises an external end proximal to the outer periphery of the cover plate and an internal end proximal to the mixing region, the mixing device further comprising a plurality of inlet regions defined as an area bound by neighboring vanes and their respective corresponding internal and external ends.

13. The reactor of claim 12, wherein the mixing device mixing region is defined as an area between the cover and base plates, excluding the areas defining the inlet regions.

14. The reactor of claim 12, wherein the internal end of each vane radially overlaps with the external end of a neighboring vane.

* * * * *